T. A. TOMASINI.
AUTOMOBILE SPRING.
APPLICATION FILED MAR. 22, 1915. RENEWED FEB. 29, 1916.
1,200,049. Patented Oct. 3, 1916.
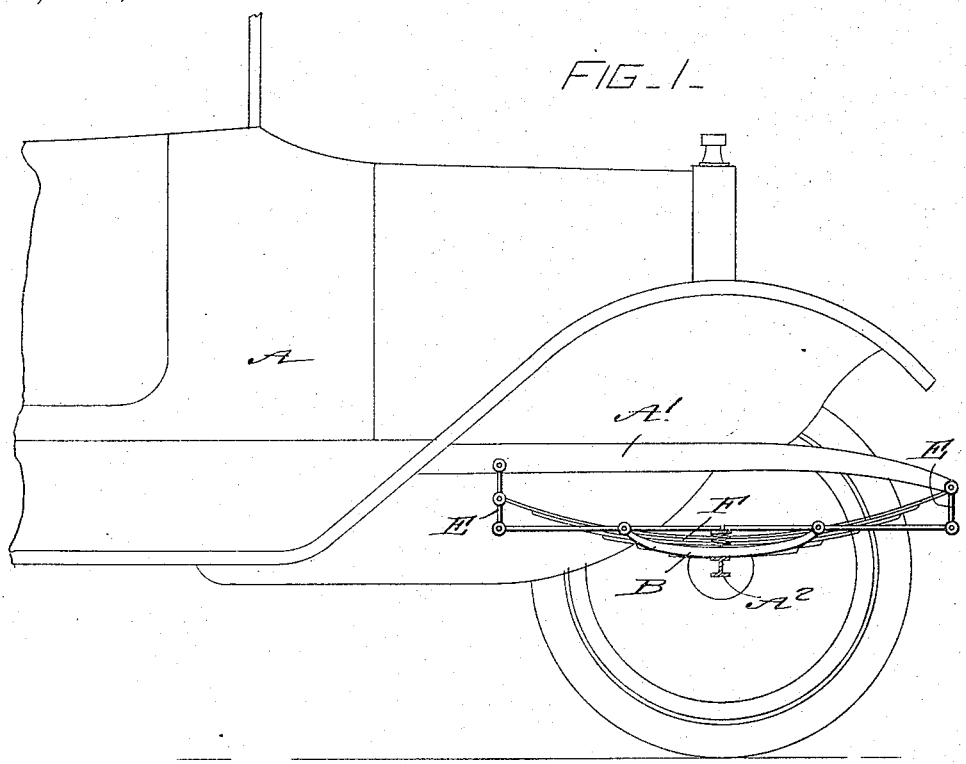
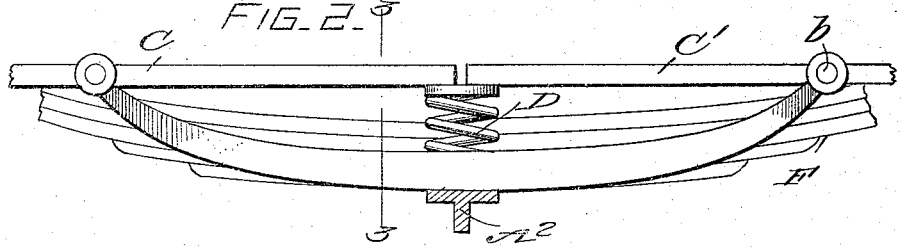
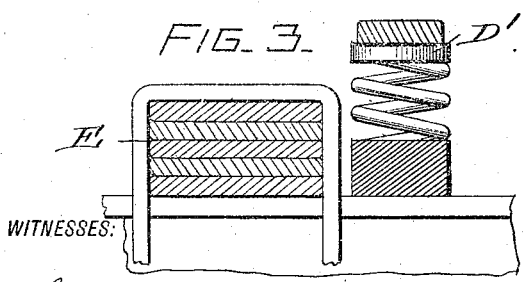
WITNESSES:
INVENTOR
THOMAS A TOMASINI,
BY Munn & Co.
ATTORNEYS

UNITED STATES PATENT OFFICE.

THOMAS A. TOMASINI, OF SAN FRANCISCO, CALIFORNIA.

AUTOMOBILE-SPRING.

1,200,049.  Specification of Letters Patent.  Patented Oct. 3, 1916.

Application filed March 22, 1915, Serial No. 16,165. Renewed February 29, 1916. Serial No. 81,294.

*To all whom it may concern:*

Be it known that I, THOMAS A. TOMASINI, a citizen of the United States, and a resident of San Francisco, in the county of San Francisco and State of California, have invented a certain new and useful Improvement in Automobile-Springs, of which the following is a specification.

My present invention relates generally to automobile springs, and more particularly to a spring for automobiles in the nature of a shock absorber, my object being to provide a construction, simple and inexpensive in its nature, capable of resisting and modifying the shocks usually following relative movement of the frame and axle of an automobile when a rock or other obstruction in the roadway is encountered.

In carrying out my invention I preferably employ the construction shown in the accompanying drawings, forming part of this application and in which—

Figure 1 is a side elevation of the forward portion of an automobile, illustrating my improvements applied thereto; Fig. 2 is a similar view of my improvement on a substantially enlarged scale; and Fig. 3 is a vertical transverse section taken substantially on line 3—3 of Fig. 2.

Referring now to these figures, the usual frame side bar A' and axle A² are shown in their ordinary relation in connection with an automobile partly shown at A in Fig. 1, the axle supporting a rigid bow shaped bracket B, the ends of which are curved upwardly and serve to intermediately support, on fulcrum $b$, a pair of levers C and C', these levers having their inner ends terminating contiguous to one another and in a line directly above the large axle A², as plainly seen in Figs. 1 and 2.

A vertically disposed coiled spring D is carried by the central portion of the bracket B, and hence finds its ultimate support in the axle A² above which it is directly placed, the spring bearing against a plate D' upon which the inner ends of the levers C and C' are disposed.

The outer ends of the levers C and C' are connected by links E and E', to the frame side bar A', the latter of these links extending to the extreme forward end of the said frame bar.

Thus the arrangement is well adapted for use in connection with the ordinary bow spring F supporting the body or frame of the car above the axle thereof, and operates to modify the severe after shock following relative movement of the body with respect to the axle when a rock or other obstruction in the road is accomplished. To this end when the body of the automobile moves vertically away from the axle A², the levers C and C', rocking on their pivots or fulcrums $b$ at the ends of the bracket B, take up and absorb, with the assistance of the spring D, all shocks ordinarily incident to such movement.

I claim:—

In a shock absorbing spring for autobiles, the combination with the frame side bars of the vehicle, and its axle; of a pair of levers having their inner ends disposed opposite to and adjacent one another above the axle, links connecting the outer ends of the said levers with the said frame side bars, a bow-shaped bracket rigidly connected to the axle and having upwardly curved outer ends upon which the said levers are intermediately fulcrumed, and a vertically disposed coil spring seated on the bracket directly above the axle and bearing upwardly against the said inner contiguous ends of the levers, for the purpose described.

THOMAS A. TOMASINI.

Witnesses:
JOSEPH E. BREN,
SILVIO J. TOMASINI.

Copies of this patent may be obtained for five cents each, by addressing the "Commissioner of Patents, Washington, D. C."